(12) United States Patent
Yamada (10) Patent No.: US 6,974,939 B1
(45) Date of Patent: Dec. 13, 2005

(54) OPTICAL RECORDING/REPRODUCING APPARATUS FOR MULTI-LAYER RECORDING MEDIA THAT ALLEVIATES ADVERSE EFFECT OF SPHERICAL ABERRATION BEYOND COMPENSATION BY CHANGING THE NUMERICAL APERTURE OF COMBINED LENSES

(75) Inventor: Eiji Yamada, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/568,888

(22) Filed: May 11, 2000

(30) Foreign Application Priority Data

May 12, 1999 (JP) ............................... 11-130702

(51) Int. Cl.$^7$ .............................................. G02B 9/00
(52) U.S. Cl. ............................. 250/201.5; 369/112.24
(58) Field of Search ...................... 369/112.23, 112.24; 250/201.5

(56) References Cited

U.S. PATENT DOCUMENTS

| | | | |
|---|---|---|---|
| 4,918,679 A | | 4/1990 | Opheij et al. |
| 5,157,555 A | * | 10/1992 | Reno ........................... 359/823 |
| 5,677,903 A | | 10/1997 | Holtslag et al. |
| 5,712,842 A | * | 1/1998 | Yamamoto et al. .......... 369/112 |
| 5,841,753 A | | 11/1998 | Holtslag et al. |
| 5,995,292 A | * | 11/1999 | McDonald ................... 359/637 |
| 6,097,688 A | * | 8/2000 | Ichimura et al. ............. 369/112 |
| 6,115,347 A | * | 9/2000 | Ichimura et al. ............. 369/112 |
| 6,130,418 A | * | 10/2000 | Van Rosamalen et al. ....... 250/201.5 |
| 6,141,302 A | | 10/2000 | Koyama et al. |
| 6,229,600 B1 | * | 5/2001 | Martynov .................... 356/123 |
| 6,381,208 B1 | | 4/2002 | Abe et al. |
| 6,414,931 B1 | | 7/2002 | Maeda et al. |
| 6,418,108 B1 | | 7/2002 | Ueda et al. |
| 6,498,775 B1 | | 12/2002 | Fan et al. |
| 6,567,365 B1 | * | 5/2003 | Hendriks et al. ........ 369/112.02 |

FOREIGN PATENT DOCUMENTS

| | | | | |
|---|---|---|---|---|
| EP | 000517491 A2 | * | 9/1992 | ........... G11B 27/00 |
| JP | A-62-3441 | | 1/1987 | ........... G11B 7/135 |
| JP | A-5-151644 | | 6/1993 | ........... G11B 13/00 |
| JP | 5-266511 | | 10/1993 | |
| JP | 8-212579 | | 8/1996 | |
| JP | 8-255347 | | 10/1996 | |
| JP | 09-251662 | | 9/1997 | |
| JP | A-9-251645 | | 9/1997 | ............ G11B 7/09 |
| JP | 10-069648 | | 3/1998 | |
| JP | 10-142494 A | | 5/1998 | |
| JP | 10-188301 | | 7/1998 | |
| JP | 10-255290 | | 9/1998 | |
| WO | WO-00/34949 | | 6/2000 | |

OTHER PUBLICATIONS

Ichimura, et al.; "O PLUS E"; Sharp: pp. 175-181: vol. 22; No. 2; Feb. 2000 (with partial English translation).

* cited by examiner

Primary Examiner—A M Psitos
(74) Attorney, Agent, or Firm—David G. Conlin; Peter J. Manus; Edwards & Angell LLP (57) ABSTRACT

An optical recording/reproducing apparatus is intended for a recording medium having at least two information recording layers. The apparatus has at least two lenses, a first lens and a second lens, for condensing a light beam to irradiate an information recording layer. The at least two lenses are designed such that a light beam condensed by these lenses upon an information recording layer closest to these lenses has a minimum spherical aberration.

5 Claims, 7 Drawing Sheets

OPTICAL RECORDING/REPRODUCING APPARATUS FOR MULTI-LAYER RECORDING MEDIA THAT ALLEVIATES ADVERSE EFFECT OF SPHERICAL ABERRATION BEYOND COMPENSATION BY CHANGING THE NUMERICAL APERTURE OF COMBINED LENSES

BACKGROUND OF THE INVENTION

The present invention relates to an optical recording/reproducing apparatus for a multi-layer recording medium having a plurality of stacked information recording layers, which irradiates each of the recording layers with a condensed light beam to record and/or reproduce information to and/or from the multi-layer recording medium.

In recent years, to increase the recording density of recording media, measures such as increasing the line recording density, decreasing the track pitch, etc. have been taken. To increase the recording density, it is necessary to reduce the diameter of a light beam condensed on an information recording layer of a recording medium. As approaches to reduction of the beam diameter, techniques of increasing the numerical aperture (NA) of a light beam outgoing from an objective lens provided in an optical recording/reproducing apparatus, making the wavelength of such a light beam shorter, etc. have been developed.

A multi-layer recording medium, which has a plurality of stacked information recording layers so as to have an increased information recording density in the direction of thickness of the recording medium, has already been commercialized as a double layer disc of DVD (digital versatile disc) format. The optical recording/reproducing apparatus for such multi-layer recording media is required to condense a light beam to a sufficiently small spot on each of the recording layers.

The different recording layers of the recording medium, however, have different spherical aberrations (SA) which occur while the light beam passes through a cover glass of the recording medium. For example, a difference $\Delta SA$ between the spherical aberrations of adjacent recording layers is proportional to $\Delta t$ and a biquadrate of NA (numerical aperture), as indicated by the following expression (1).

$$\Delta SA \propto \Delta t \times NA^4 \qquad (1)$$

where $\Delta t$ is a distance between the adjacent recording layers.

When the numerical aperture NA of the objective lens is around 0.6, a value of $\Delta SA$ (difference between the spherical aberrations of adjacent recording layers) is comparatively small as in conventional DVD discs. Therefore, it was possible to condense a light beam to a sufficiently small spot on each recording layer.

If the numerical aperture NA is increased up to, for example, 0.85, the spherical aberration difference $\Delta SA$ becomes about 4 times larger than when NA=0.6. Accordingly, the spherical aberrations of each of the recording layers become larger. For this reason, it is difficult to sufficiently converge a light beam on each of the recording layers.

SUMMARY OF THE INVENTION

A primary object of the present invention is therefore to provide an optical recording/reproducing apparatus for a recording medium having at least two information recording layers, which can make sufficiently small the diameter of a condensed light beam on each recording layer even when an objective lens has an increased aperture.

According to the present invention, there is provided an apparatus for recording and/or reproducing information to and/or from a recording medium having at least two information recording layers by irradiating a recording layer with a light beam condensed by at least two combined lenses including a first lens and a second lens, with a spherical aberration of the condensed light beam on each information recording layer compensated by changing a distance between the first and second lenses, wherein the at least two lenses are designed such that a light beam condensed by these lenses upon an information recording layer closest to these lenses has a minimum spherical aberration.

In other words, according to the present invention, the lenses for condensing the light beam are designed to be optimized for the information recording layer closest to these lenses.

The at least two lenses may be designed such that changing (increasing or decreasing) the distance between said first and second lenses from d1 causes a numerical aperture of the lenses to increase from NA1, where d1 and NA1 are a distance between the first and second lenses and a numerical aperture, respectively, when the light beam condensed on the closest information recording layer has the minimum spherical aberration.

The distance between said first and second lenses may be adjusted for each information recording layer such that the light beam condensed on the information recording layer has a minimum diameter.

Other objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
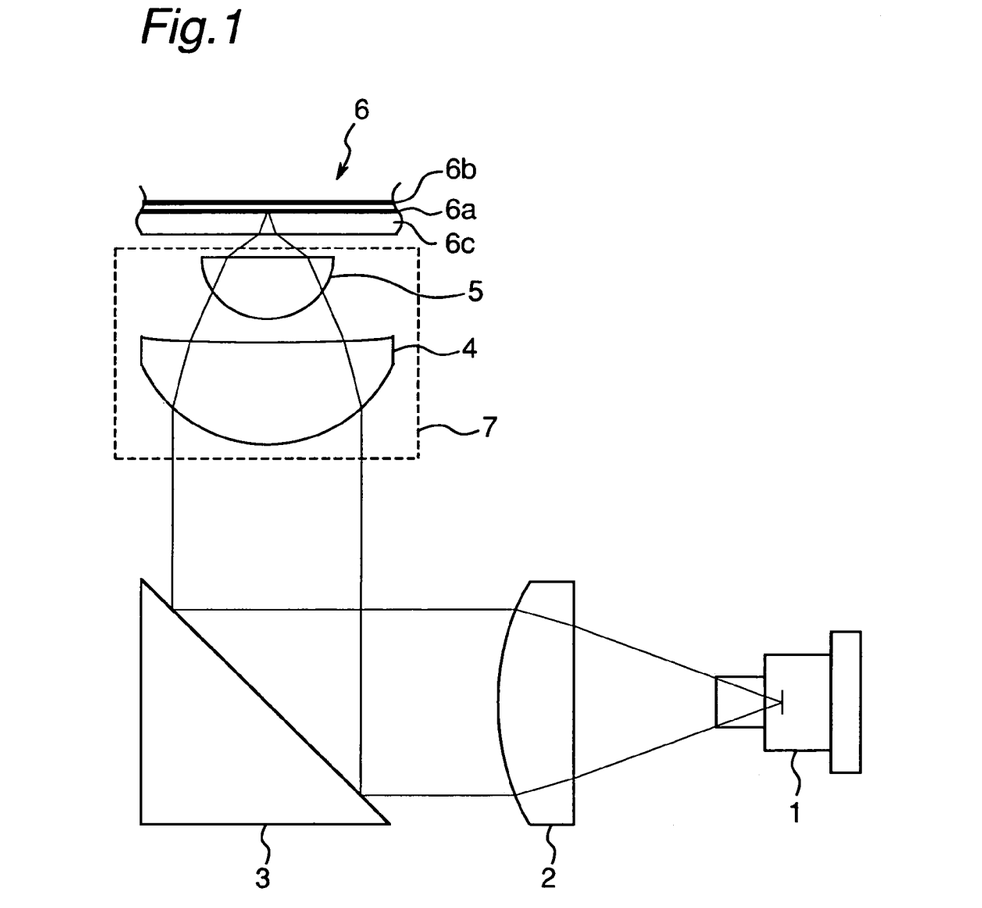
FIG. 1 is a schematic view of an entire optical recording/reproducing apparatus according to an embodiment of the present invention.

FIG. 1 schematically shows an entire optical recording/reproducing apparatus according to an embodiment, which is not limitative of the present invention.

The optical recording/reproducing apparatus includes a hologram laser unit 1, collimator lens 2, a veering mirror 3, and an objective lens unit, surrounded by broken lines and generally designated by reference numeral 7, which has a first lens 4 and a second lens 5. Light rays output from the hologram laser unit 1 pass the collimator lens 2 to become parallel light rays. Then, the parallel light rays, or a light beam, travelling in a horizontal direction is turned vertically upward by the veering mirror 3. Then, the light beam travelling upward enters the two lenses 4 and 5 of the objective lens unit 7 sequentially.

The objective lens unit 7 is designed such that a light beam passing the first lens 4 first and then the second lens 5 is condensed or converged on an information recording layer (simply "recording layer" below) 6a or 6b of a recording medium 6 without aberration occurring.

Light rays reflected on the recording layer 6a or 6b of the recording medium enter the objective lens unit 7 again and pass the second lens 5 and the first lens 4 in this order to become a flux of parallel light rays. The parallel light rays output from the objective lens unit 7 travel downward and then veered toward the collimator lens 2 by the mirror 3. After passing the collimator lens 2, the light enters the hologram laser unit 1.

A focusing operation and a tracking operation are performed by changing a position of the objective lens unit 7 relative to the recording medium 6 in an optical axis direction and a direction vertical to an optical axis, respectively.

The "focusing" operation is defined as an operation by which a working distance WD, i.e., a distance between the objective lens unit 7 and the recording medium 6 is kept constant so that a focal point of the light beam falls on the recording layer 6a or 6b of the recording medium 7. On the other hand, the "tracking" operation is defined as an operation by which the focal point of the light beam follows a track of the recording medium 6. In other words, the focusing operation means a displacement of the objective lens unit 7 in the optical axis direction, that is, in a direction normal to the recording medium, while the tracking operation means a displacement of the objective lens unit 7 in a radial direction of the recording medium.

The embodiment of FIG. 1 uses the veering mirror 3, which is simply intended to thin the optical recording/reproducing apparatus. Therefore, the mirror 3 is inessential and may be omitted.

To reduce the overall size and thickness of the apparatus, in addition to the mirror 3, the embodiment of FIG. 1 also uses the hologram laser unit 1 in which a laser source is integrated with a signal detector for detecting a focusing signal, a tracking signal, and information signal indicative of recorded information. Alternatively, an ordinary optical system may be used in which a laser source is provided separately from a signal detector.

The reason why the objective lens unit 7 includes two lenses 4 and 5 is that it becomes more difficult to constitute an objective lens of a single lens according as the numerical aperture increases. That is, a manufacturing tolerance and an assembling tolerance of the lens become stricter, or smaller. Accordingly, with a mono-lens objective, the aberration is hardly suppressed within a tolerable range, which in turn makes it impossible to sufficiently reduce the beam diameter. To address this problem, an objective lens is combined with a semispherical lens so that these two lenses in combination constitute an objective. By so doing, the manufacturing tolerance and assembling tolerance of the lens are relieved, so that an increased numerical aperture is achieved.

In recording onto or reproducing from a multi-layer recording medium, a distance between the two lenses (referred to as simply "lens distance" below) may be changed so that a light beam is condensed to a sufficiently small spot on every recording layer. In other words, changing the lens distance enables a change in an amount of spherical aberration of a light beam output from the objective lens unit 7. By canceling this spherical aberration and a spherical aberration which will take place when a light beam passes through a cover glass 6c of the recording medium, the light beam will be condensed in a spot on a target recording layer without aberration.

Figure 2:
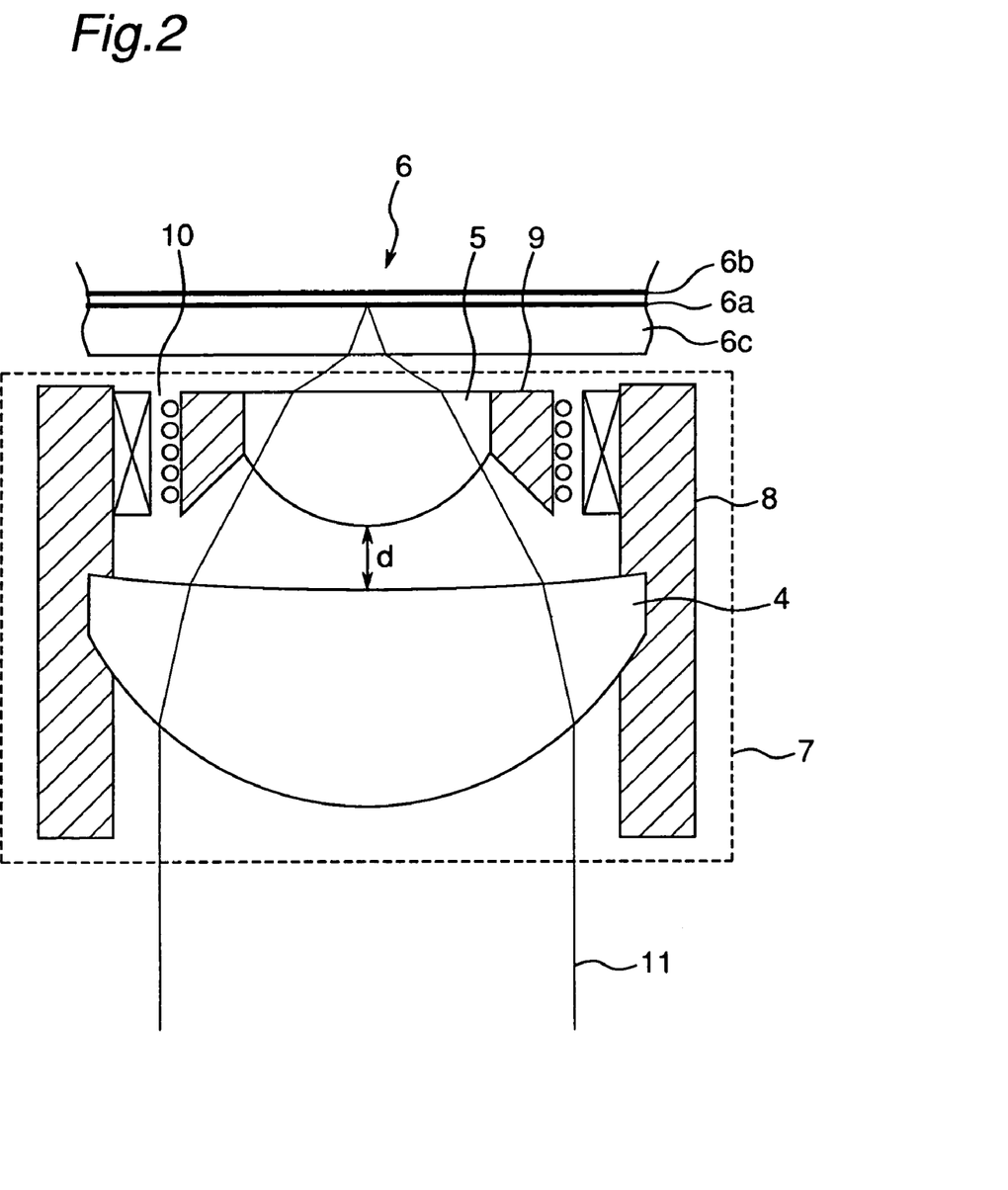
FIG. 2 shows an objective lens unit used in the apparatus of FIG. 1 in detail.

FIG. 2 shows the construction of the objective lens unit 7 in detail.

A light beam 11 entering the objective lens unit 7 pass the first lens 4 and the second lens 5 in this order and is finally condensed or focused on the recording layer 6a or 6b of the recording medium 6. The first lens element 4 is held by a holder 8, while the second lens 5 is held by a holder 9. There are provided actuators (not shown) for the focusing operation and the tracking operation, respectively, around the holder 8. Also, an actuator 10 is provided between the holders 8 and 9 to drive the second lens 5. This actuator 10 allows the second lens element 5 to move relative to the first lens 4 to thereby change the distance between these lenses 4 and 5.

Table 1 below shows various design data of the objective lens unit 7.

TABLE 1

| SUR-FACE NUMBER | CURVATURE RADIUS (mm) | DISTANCE TO THE NEXT SURFACE (mm) | INDEX OF REFRACTION OF GLASS |
|---|---|---|---|
| STO | INFINITY | 0 | |
| S1 | 2.29957 | 1.8 | 1.49412 |
| | K: −0.546649 | | |
| | A: 0.677362E−03 | B: −0.533334E−05 | C: −0.531520E−04 |
| | D: −0.431210E−05 | | |
| S2 | 9.13242 | 1.512 | |
| | K: −32.356495 | | |
| | A: 0.250189E−02 | B: 0.276494E−03 | C: −0.448344E−04 |
| | D: −0.127558E−03 | E: 0.328618E−06 | F: 0.243094E−04 |
| | G: −0.451777E−05 | | |
| S3 | 1.11556 | 1.2 | 1.58701 |
| | K: −0.317089 | | |
| | A: −0.626846E−02 | B: 0.627622E−02 | C: 0.769126E−02 |
| | D: −0.150332E−01 | | |
| S4 | INFINITY | 0.3 | |
| S5 | INFINITY | 0.1 | 1.53300 |
| IMAGE | INFINITY | | |

In Table 1, surface S1 is a lens surface closer to the mirror 3 of the first lens 4, surfaces S2 and S3 are confronting lens surfaces of the first lens 4 and the second lens 5, respectively. Surface S4 is a lens surface confronting the recording medium 6 of the second lens 5, and surface S5 is a surface confronting surface S4 of the recording medium 6, namely an outer surface of the cover glass 6c. A surface defined as IMAGE indicates a recording layer. Table 1 indicates that the working distance is 0.3 mm and that the cover glass 6c of the recording medium has a thickness of 0.1 mm.

The light beam has a wavelength of 635 nm.

The lens shape is defined by the following formula (2).

$$z = \frac{cr^2}{1 + \sqrt{1 - (1+k)c^2r^2}} + A_r 4 + B_r 6 + C_r 8 + D_r 10 + E_r 12 + E_r 14 + G_r 16 \quad (2)$$

where
- z: a displacement in the optical axis direction from an apex of a lens surface;
- r: a height from the optical axis (a radial coordinate value);
- c: a curvature (=1/[a radius of curvature]);
- k: a conical coefficient;
- A: a non-spherical coefficient the quartic (fourth-power);
- B: a non-spherical coefficient of the sixth-power;
- C: a non-spherical coefficient of the eighth-power;
- D: a non-spherical coefficient of the tenth-power;
- E: a non-spherical coefficient of the 12th-power;
- F: a non-spherical coefficient of the 14th-power; and
- G: a non-spherical coefficient of the 16th-power.

The objective lens unit 7 is designed such that the wavefront aberration, WFErms, is minimum when the cover glass 6c of the recording medium 6 has a thickness of 0.1 mm.

Figure 3:
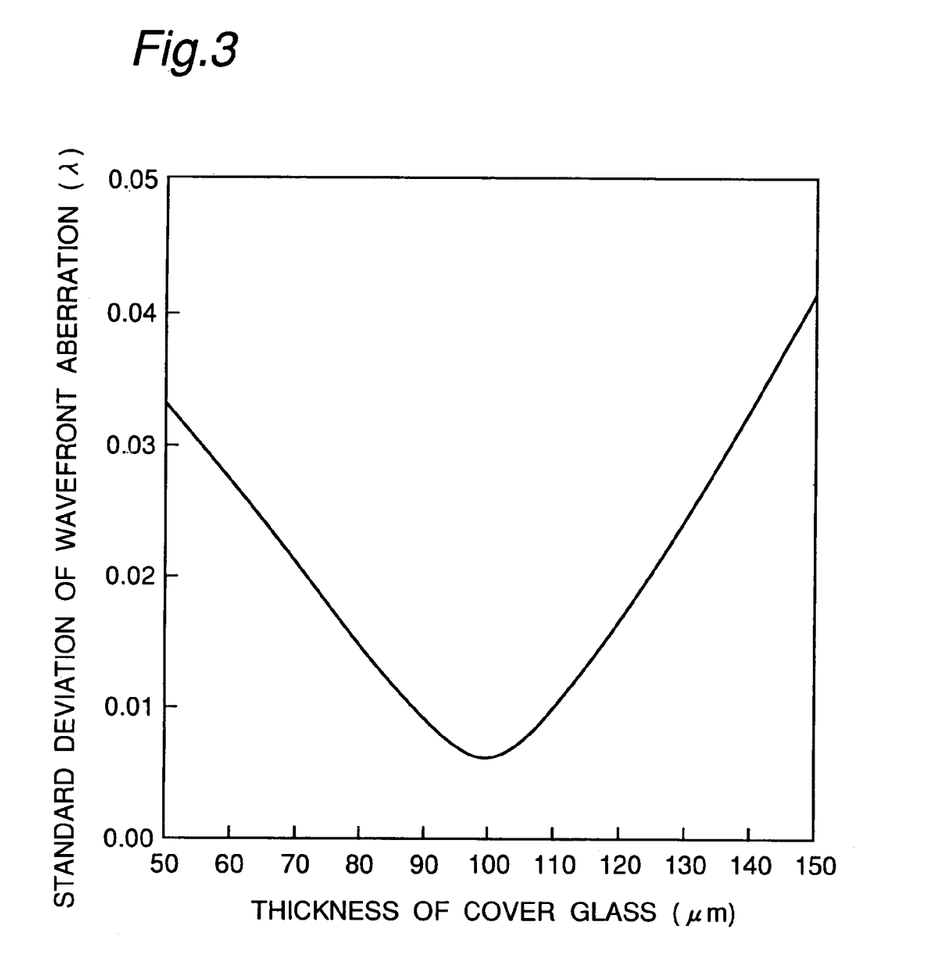
FIG. 3 is a graph showing relationship between the thickness of a cover glass and the standard deviation of wavefront aberration, WFErms.

FIG. 3 shows relationship between the thickness of the cover glass and the standard deviation of the wavefront aberration, WFErms. The standard deviation of the wavefront aberration, WFErms, is a value obtained when the working distance, WD, and the lens distance, d, are adjusted such that a light beam is focused on a recording layer and that the wavefront aberration, WFErms, becomes small, in other words, such that the light beam has a minimum diameter when on the recording layer.

Figure 7:
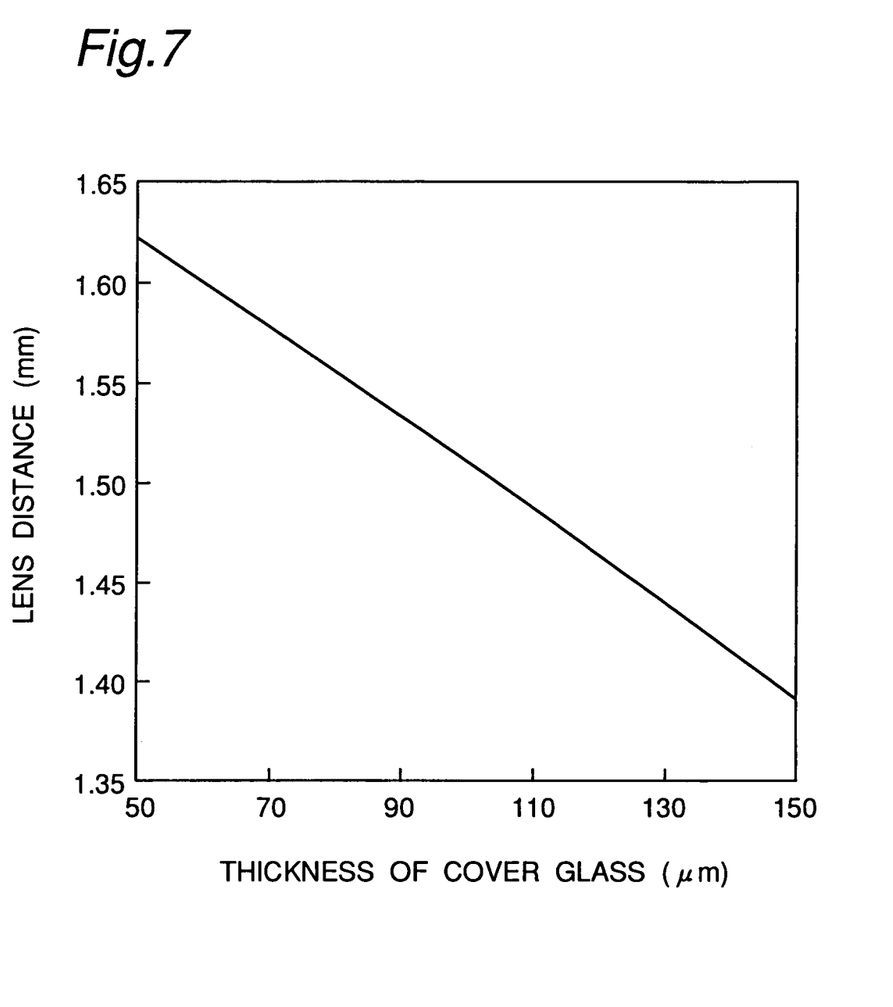
FIG. 7 is a graph showing relationship between the thickness of a cover glass and the lens distance.

FIG. 7 shows a relationship between the thickness of the cover glass and the adjusted lens distance, d. As is obvious from FIG. 7, the thickness of the cover glass and the adjusted lens distance, d, are in one-to-one correspondence. This means that for one particular thickness of the cover glass, only one optimum lens distance which minimizes the wavefront aberration is given.

It is seen from FIGS. 3 and 7 that for the cover glass thickness of 100 μm (=0.1 mm), for example, the lens distance that gives a minimum wavefront aberration, WFErms, is 1.512 mm, when the wavefront aberration, WFErms, is 0.006λ. When the cover glass has a thickness of 150 μm, the lens distance minimizing the wavefront aberration, WFErms, is 1.392 mm, when the wavefront aberration, WFErms, is 0.042λ. The optimum lens distance decreases with the increasing thickness of the cover glass.

The wavefront aberration, WFErms, is a residual spherical aberration which was originally caused by the variation of the thickness of the cover glass and which was not compensated or canceled by changing the lens distance.

Generally speaking, the smaller the standard deviation of the wavefront aberration, WFErms, is, the more the light beam can be tapered to the diffraction limits. As is obvious from FIG. 3, when the thickness of the cover glass is 0.1 mm, the wavefront aberration, WFErms, becomes minimum. Therefore, it is possible to taper the light beam to a diameter to such an extent that the diffraction limits are approached. On the other hand, according as the thickness of cover glass differs more largely from the value of 0.1 mm, the wavefront aberration, WFErms, increases. Therefore, it becomes more and more difficult to eventually be impossible to taper the light beam to a diameter close to the diffraction limits.

The light beam diameter, W, at the diffraction limits is proportional to the light wavelength, λ, and is inversely proportional to the numerical aperture, NA, of the objective lens, as expressed by the following formula (3).

$$W \propto \frac{\lambda}{NA} \quad (3)$$

Thus, according as the numerical aperture increases, the beam diameter becomes smaller.

Figure 4:
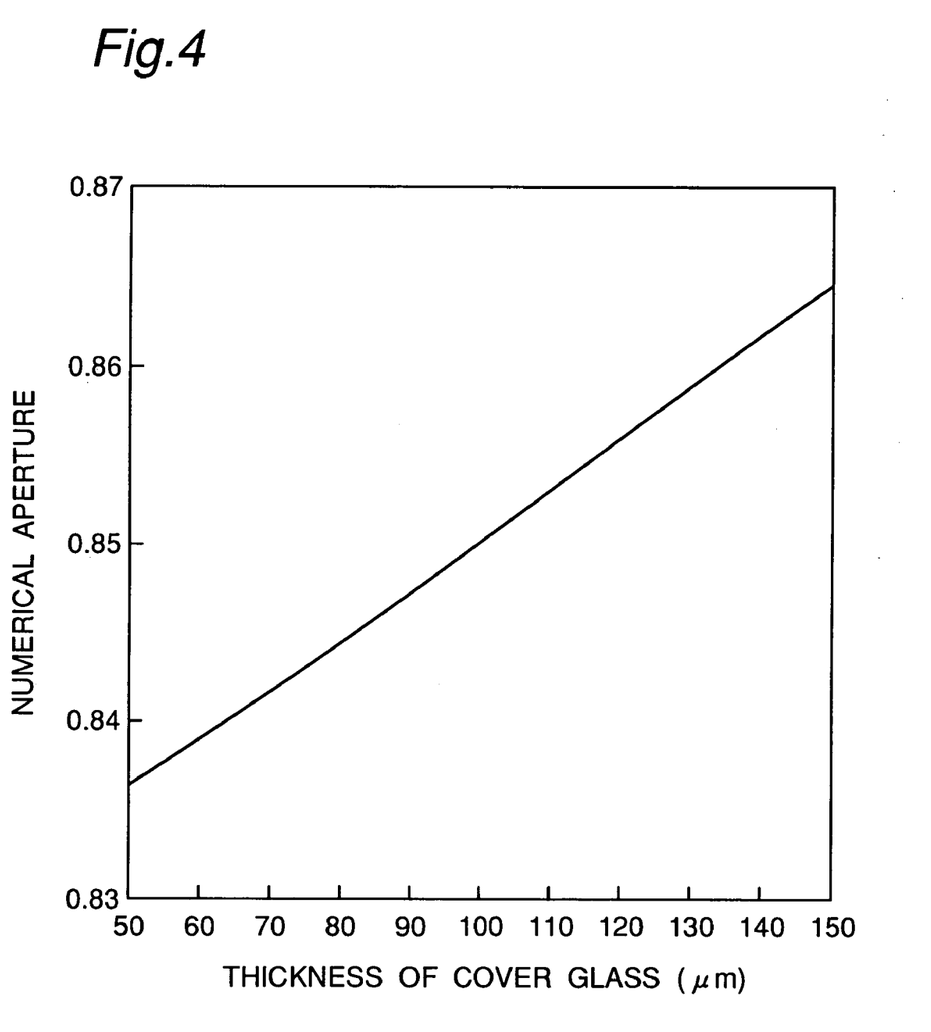
FIG. 4 is a graph showing relationship between the thickness of a cover glass and the numerical aperture NA.

FIG. 4 shows relationship between the cover glass thickness and the numerical aperture, NA, in the case where the objective lens unit 7 shown in Table 1 is used. As the cover glass has a larger thickness, the numerical aperture increases. Accordingly, as the cover glass thickness increases, the light beam diameter at the diffraction limits decreases.

As understood from the above, if the cover glass has a thickness smaller than 0.1 mm, the wavefront aberration, WFErms, deteriorates. In addition, the beam diameter at the diffraction limits, disadvantageously, is increased. On the other hand, if the cover glass has a thickness larger than 0.1 mm, the wavefront aberration, WFErms, deteriorates, but the beam diameter at the diffraction limits is reduced because the numerical aperture increases. In sum, as far as cover glass thicknesses in the neighborhood of 0.1 mm are concerned, a cover glass thickness of larger than 0.1 mm enables a smaller beam diameter to be achieved than a cover glass thickness of less than 0.1 mm does.

Figure 5:
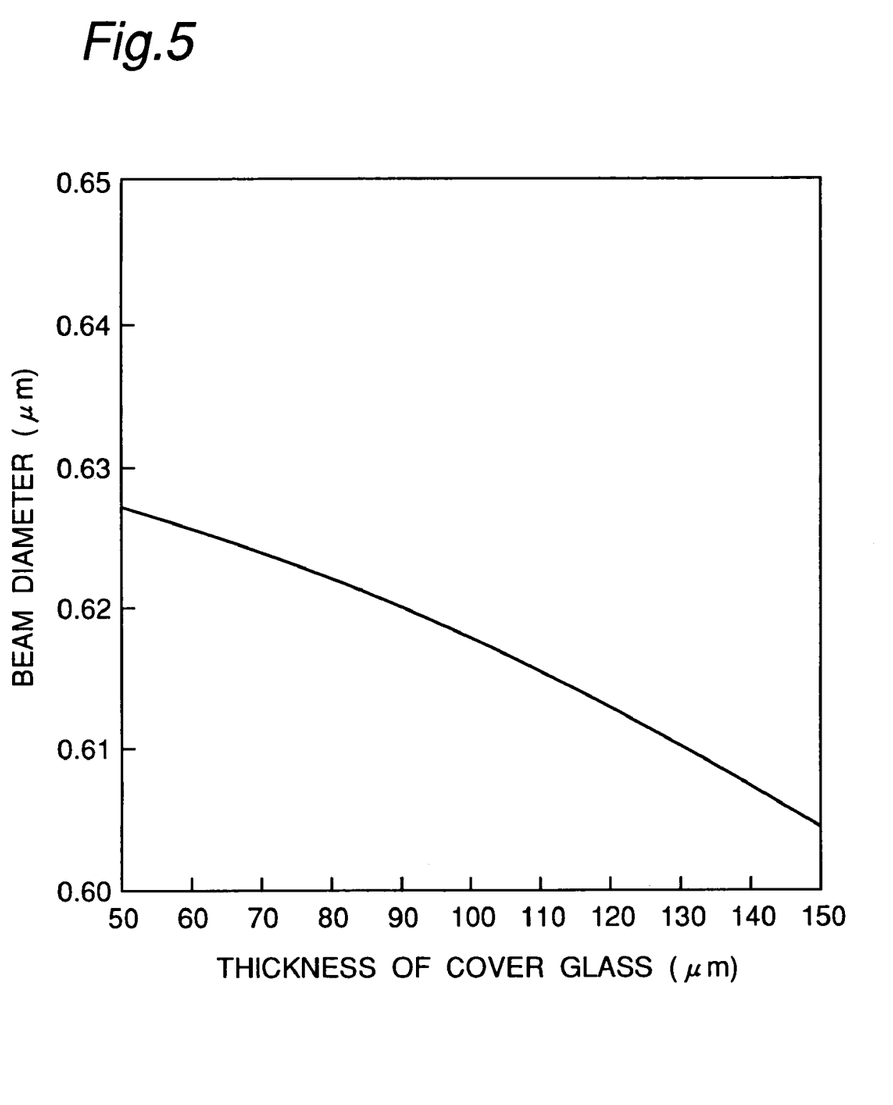
FIG. 5 is a graph showing relationship between he thickness of a cover glass and the beam diameter.

The relationship between the beam diameter and the cover glass thickness in the case where the objective lens unit 7 shown in Table 1 is used is shown in FIG. 5. The beam diameter here is defined as a diameter at which the light beam has an intensity which is $1/e^2$ (approximately equal to 13.5%) of the central intensity (see FIG. 6) in the intensity distribution in the sectional direction of the light beam. FIG. 5 indicates that the beam diameter decreases with increasing thickness of the cover glass.

Figure 6:
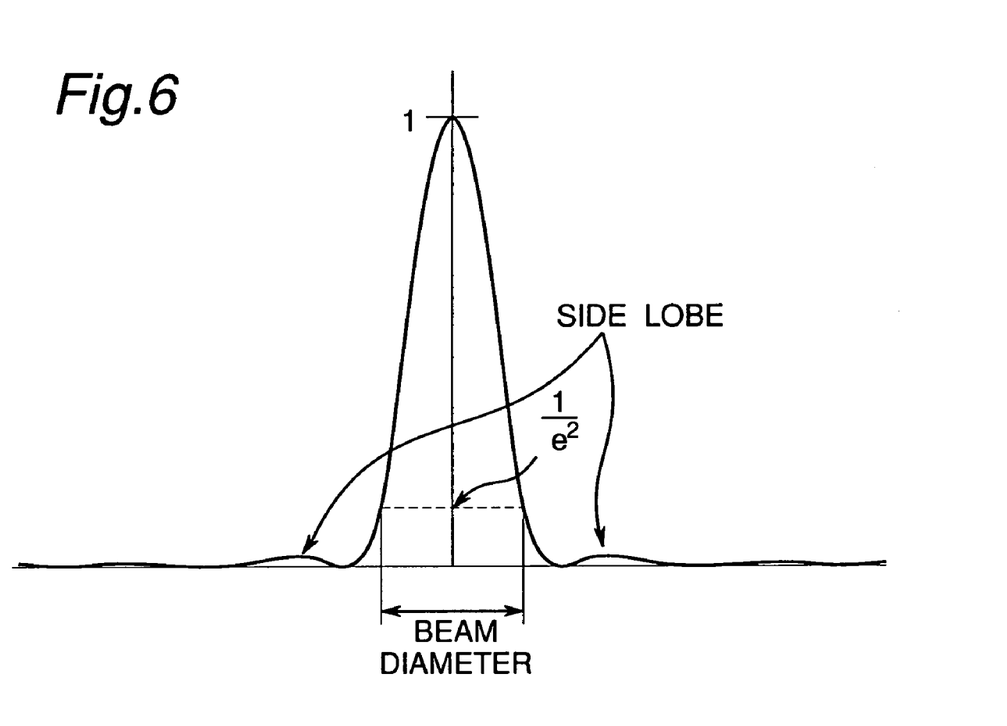
FIG. 6 shows intensity distribution in a sectional direction of a light beam.

As the cover glass thickness goes farther away from 0.1 mm, however, the wavefront aberration, WFErms, deteriorates more. Therefore, intensity of the side lobe in the periphery of the light beam increases. For example, when using the objective lens unit 7 shown in Table 1, if the cover glass has a thickness of 0.15 mm, there occurs a side lobe as shown in FIG. 6. Without a side lobe, a signal detector in the hologram laser unit 1 receives only reflection of a light beam from a spot of a recording layer irradiated with the light beam. If there is a side lobe, however, a reflection from a zone around the spot is also detected by the signal detector. The reflection due to the side lobe is a noise to a reproduction signal, and deteriorates the reproduction signal. Thus, the spherical aberration which remains without being compensated by adjustment of the lens distance does not increase the diameter of the light beam, but increases the intensity of the side lobe.

As described above, as far as the cover glass thicknesses in the neighborhood of 0.1 mm are concerned, a cover glass thickness of more than 0.1 mm allows a smaller beam diameter to be achieved than a cover glass thickness of less than 0.1 mm. Therefore, if the noise due to the side lobe is within a tolerable range, the plurality of recording layers should be positioned at a distance of, preferably, 0.1 mm or more from an outer surface of the recording medium.

More specifically, preferably, a recording layer closest to the objective lens unit should be formed at a distance of 0.1 mm from the outer surface opposed to the objective lens unit of a recording medium (meaning that the cover glass has a thickness of 0.1 mm), and the other recording layers should be formed at a distance of more than 0.1 mm from the surface of the recording medium.

For example, in the case of the recording medium 6 shown in FIG. 1 having two recording layers, the cover glass 6c underlying the first recording layer 6a should have a thickness of 0.1 mm, and the second recording layer 6b should be positioned at the distance of 0.1 mm+$\Delta$t from the recording medium outer surface to be opposed to the objective lens unit 7. A value of $\Delta$t may be, for example, 0.02 mm.

In the recording layers formed at the distance of more than 0.1 mm from a recording medium surface closer to the objective lens unit, the focused light beam has a decreasing spot diameter, which allows the recording density to be increased. Accordingly, the recording medium may be formed such that a recording layer at a longer distance from the outer surface adjacent to the objective lens unit has a higher recording density. From the practical point of view, however, there is a limit in increasing the recording density because the noise caused by the side lobe increases as the distance from the recording medium outer surface to the recording layer becomes longer. In this connection, in the case of a recording medium having a single recording layer, if the cover glass has a thickness that allows a maximum recording density to be attained (i.e., the thickness being more than 0.1 mm), this recording medium has a maximum storage capacity.

On the other hand, as described above, recording layers positioned at longer distances than 0.1 mm from the outer surface of the recording medium will increase the noise due to the side lobe. Therefore, if the influence of the noise is larger than the effect brought by reduction of the light beam diameter, it is advisable to lower the recording density of such recording layers according as the recording layers are farther from the recording medium surface adjacent to the objective lens unit. In this connection, in the case of a recording medium having a single recording layer, a cover glass 0.1 mm thick will provide a maximum storage capacity of the recording medium.

In the above embodiment, the objective lens unit 7 includes two lenses. Alternatively, three or more lenses may be used. For example, two lenses may have their shares of the function of the objective lens 4 so that totally three lenses are used.

Also, the embodiment has been described in connection with the recording medium 6 having two recording layers 6a and 6b. Needless to say, the present invention is also applicable to recording media having more than two recording layers.

Also, in the described embodiment, the objective lens unit 7 is designed such that the numerical aperture is increased by decreasing the lens distance, d, as is obvious from FIGS. 4 and 7. Alternatively, the objective lens unit may be designed such that the numerical aperture is increased by increasing the lens distance, d.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for recording and/or reproducing information to and/or from a recording medium having at least two information recording layers that are mutually spaced along an optical axis, comprising:

a light source that irradiates the at least two recording layers with a light beam propagating along the optical axis, at least two combined lenses including a first lens and a second lens that are mutually spaced by a distance d along the optical axis and focus said light beam to a spot on the at least two information recording layers, an actuator that changes said distance d to change the spherical aberration of the condensed light beam at said spot on each said information recording layer and a numerical aperture of said at least two combined lenses, wherein the light beam condensed upon each of said at least two information recording layers has a respective minimum spherical aberration for each information recording layer, said at least two combined lenses are designed such that the minimum spherical aberration of the condensed light beam on a specified one of the at least two information recording layers is smaller than the minimum spherical aberration for any other information recording layer, when recording and/or reproducing information to and/or from a target one of the at least two information recording layers, the actuator changes the distance d such that the spherical aberration of the light beam assumes the minimum value for the targeted information recording layer, and a lens shape, a lens thickness, and a refractive index of each of said at least two combined lenses are set such that, with an increasing distance of the targeted information recording layer from said at least two combined lenses, the numerical aperture of these lenses is increased such that a diameter of the light beam condensed on the targeted recording layer is decreased as far as increase of noise due to side lobe falls in an allowable range.

2. The apparatus according to claim 1, wherein said at least two combined lenses are designed such that changing the distance between said first and second lenses from d1 causes a numerical aperture of the lenses to increase from NA1, where d1 and NA1 are a distance between said first and second lenses and a numerical aperture, respectively, when the light beam condensed on the closest information recording layer has said minimum spherical aberration.

3. The apparatus according to claim 1, wherein said actuator changes distance between said first and second lenses to adjust the condensing of said at least two combined lenses for each information recording layer such that the light beam condensed upon the information recording layer has a minimum diameter.

4. The apparatus according to claim 2, wherein said actuator changes distance between said first and second lenses to adjust the condensing of said at least two combined lenses for each information recording layer such that the light beam condensed upon the information recording layer has a minimum diameter.

5. The apparatus according to claim 1, wherein said specified information recording layer is the one closest to said combined lenses.

* * * * *